United States Patent
Kato

(10) Patent No.: US 7,284,408 B2
(45) Date of Patent: *Oct. 23, 2007

(54) SENSOR SYSTEM

(75) Inventor: Kenji Kato, Okazaki (JP)

(73) Assignee: DENSO CORPORATION, Kariya (JP)

( * ) Notice: Subject to any disclaimer, the term of this patent is extended or adjusted under 35 U.S.C. 154(b) by 269 days.

This patent is subject to a terminal disclaimer.

(21) Appl. No.: 11/085,124

(22) Filed: Mar. 22, 2005

(65) Prior Publication Data

US 2005/0216149 A1     Sep. 29, 2005

(30) Foreign Application Priority Data

Mar. 25, 2004  (JP)  ............................. 2004-090408

(51) Int. Cl.
*G01P 21/00* (2006.01)
*G01P 9/04* (2006.01)
(52) U.S. Cl. .................. 73/1.37; 73/504.04; 73/504.12
(58) Field of Classification Search ................ 73/1.37, 73/1.38, 504.04, 504.12, 510
See application file for complete search history.

(56) References Cited

U.S. PATENT DOCUMENTS 7,031,852 B2 *   4/2006   Kato ..................... 73/504.12
2005/0217375 A1 * 10/2005   Mase .................... 73/504.12

FOREIGN PATENT DOCUMENTS

JP      B2-2504233      7/1991
JP      A-2001-153659   6/2001

* cited by examiner

*Primary Examiner*—John E. Chapman
(74) *Attorney, Agent, or Firm*—Posz Law Group, PLC

(57) ABSTRACT

An inertia sensor system incorporates a vibration-type angular-speed sensor unit and an acceleration sensor unit provided separately. The inertia sensor system also includes a second-type acceleration signal generation unit to extract an acceleration signal component from a detection-object vibration component generated by the vibration-type angular-speed sensor unit and outputs the extracted acceleration signal component as a second-type acceleration signal. An abnormality detection unit detects an abnormality of at least the vibration-type angular-speed sensor unit or the acceleration sensor unit based on the second-type acceleration signal and a first-type acceleration signal detected and output by the acceleration sensor unit.

9 Claims, 6 Drawing Sheets

SENSOR SYSTEM

CROSS REFERENCE TO RELATED APPLICATION

This application is based upon, claims the benefit of priority of, and incorporates by reference the contents of, Japanese Patent Application No. 2004-90408 filed on Mar. 25, 2004.

FIELD OF THE INVENTION

The present invention relates generally to a sensor system used in control of a vehicle. More particularly, the present invention relates to a sensor system comprising an embedded vibration-type angular-speed sensor and an embedded acceleration sensor, which are used in typically control of a vehicle, and having an abnormality detection function for detecting abnormalities of the sensors.

BACKGROUND OF THE INVENTION

Methods of sensing angular-speed within a sensor (such as, for example, a gyro sensor) include a mechanical method, an optical method and a fluid method. The mechanical method is a method utilizing the precession or a body of revolution. The optical method is a method utilizing changes in optical-reception timing, which are caused by the rotation of an enclosure of a laser beam orbiting inside the enclosure. The liquid method is a method whereby gas for sensing the angular speed in an enclosure is injected to heat rays, and changes in injection amount, which are caused by the rotation of the enclosure, are detected as a heat-ray temperature. On the other hand, demand for an angular-speed sensor for detecting the movement direction of a vehicle in a car-navigation system and the like has risen rapidly in recent years. As such an angular-speed sensor, a vibration-type angular-speed sensor, which is inexpensive and light in comparison with the methods described above, has become predominant. In the vibration-type angular-speed sensor, when an angular speed is applied to a vibrator vibrating in a reference direction determined in advance, a new vibration component based on a Coriolis force is detected in a detection direction perpendicular to the reference direction and an angular speed is output based on the detected vibration component.

Systems for controlling a vehicle by using an angular-speed sensor, a vehicle stability control system and a 4-wheel steering-angle control system are commonly known. The vehicle stability control system of a vehicle is a system for keeping the vehicle in a normal state by detecting transversal skid of the vehicle and controlling the brake and torque of the vehicle in an optimal manner. On the other hand, the 4-wheel steering-angle control system is a system for controlling the steering angle of the rear or front wheels of the vehicle. The conventional systems of this type detect an abnormal state of the vehicle as an angular-speed signal generated by an angular-speed sensor. Enhancement of the reliability of the detection of this angular-speed signal is demanded. An example of the abnormal state of the vehicle is the transversal skid cited above.

In relation to the problem described above, JP-2001-153659A and Japanese Patent No. 2,504,233 disclose the following technology. When a drive amplitude of a vibrator employed in a vibration-type angular-speed sensor goes beyond a prescribed range, an abnormality may be generated at a zero point of the output of the angular-speed sensor or in the sensitivity of the sensor. Thus, the drive amplitude is detected to determine whether or not the amplitude is within the prescribed range. In addition, when a vehicle receives a large shock from hitting a curb or the like, the shock is also propagated to an angular-speed sensor mounted on the vehicle. In this case, a signal of a processing circuit in the angular-speed sensor is saturated because of the shock, so that the signal may no longer represent an angular speed (or a yaw rate), which is an original quantity to be detected. In order to solve this problem, the signal output by the angular-speed sensor is examined to determine whether or not the signal exceeds a predetermined level. When the signal output by the angular-speed sensor exceeds the predetermined level, an abnormality is determined to have occurred in the control system of the vehicle. To put it concretely, the drive amplitude of the vibrator is detected by means of a piezoelectric element, being converted into a voltage in a charge-voltage conversion process. The voltage is then rectified into a DC signal, which is used as an amplitude monitor signal. Then, the level of the amplitude monitor signal is examined to determine whether or not the level is within a predetermined range. A level of the amplitude monitor signal beyond the predetermined range indicates an abnormality.

In recent years, however, miniaturization of the vibrator is demanded. To meet this demand, a semiconductor-type vibrator having an electrostatic capacitor as detection means serving as a substitute for the piezoelectric device is gradually being used as a replacement of the conventional vibrator. In this case, however, attachment of infinitesimal foreign particles, which did not raise a problem in the prior system, also has an effect on the sensitivity and zero point of the angular-speed sensor. Consequently, only detection of an abnormality of the vibration amplitude of the vibrator and detection of an abnormality caused by a disturbance and a shock are no longer sufficient.

SUMMARY OF THE INVENTION

It is thus an object to provide a sensor system including an embedded vibration-type angular-speed sensor and an embedded acceleration sensor, which are used typically in control of a vehicle and to make the sensor system capable of detecting an abnormality with a high degree of precision.

In order to solve the problems described above, a sensor system according to a first aspect comprises a vibration-type angular-speed sensor unit including: a vibrator vibrating in a reference direction determined in advance; and a detection waveform generation unit for detecting a detection-object vibration component resulting from application of an angular speed to the vibrator in an angular-speed detection direction set to cross the reference direction and for generating an angular-speed detection waveform based on the detection-object vibration component; an acceleration sensor unit provided separately from the vibration-type angular-speed sensor unit; a second-type acceleration-signal generation unit for extracting an acceleration signal component from a detection-object vibration component generated by the vibration-type angular-speed sensor unit and outputting the extracted acceleration signal component as a second-type acceleration signal; and an abnormality detection unit for detecting an abnormality of at least the vibration-type angular-speed sensor unit or the acceleration sensor unit based on the second-type acceleration signal and a first-type acceleration signal, which is an acceleration signal detected and output by the acceleration sensor unit.

When an angular speed is applied to the vibrator driven to vibrate in the reference direction, the vibration-type angular-speed sensor unit fetches a vibration component originated from a Coriolis force in the angular-speed detection direction set to cross the reference direction (perpendicularly in normal cases) in the form of an angular-speed signal. However, when an acceleration component is generated translationally to the angular-speed detection direction, the acceleration component is superposed on the angular-speed signal. Thus, from the acceleration-detection point of view, the acceleration component is a noise component. Traditionally, attention is paid only to how to eliminate the superposed acceleration component.

Further, in many vehicle control systems, a single sensor is used to function as both the angular-speed sensor and the acceleration sensor. Thus, the inventors of the present invention have changed this concept. That is, with an acceleration component superposed on a detection-object vibration component included in the output of the vibration-type angular-speed sensor unit, when the component of the acceleration signal and the component of the angular-speed signal can be separated from each other, the component of the acceleration signal can be utilized as a second-type acceleration signal different from a first-type acceleration signal where the first-type acceleration signal is a regular acceleration signal generated by the acceleration sensor unit whereas the second-type acceleration signal is an acceleration signal generated by a system other than that generating the first-type acceleration signal. When the vibration-type angular-speed sensor unit and the acceleration sensor unit operate normally, the acceleration signals generated by the two systems show almost the same acceleration levels. When one of the vibration-type angular-speed sensor unit and the acceleration sensor unit operates abnormally, on the other hand, the acceleration signals generated by the two systems show different acceleration levels. The difference in acceleration level can be detected as an abnormality.

Even when the vibration-type angular-speed sensor unit is a sensor unit having a zero point and sensitivity, which are subtly affected by an attached foreign particle, for example, the abnormality caused by the foreign particle can be detected with a high degree of precision by comparison of the second-type acceleration signal separated and extracted from the angular-speed signal with the first-type acceleration signal generated by the acceleration sensor unit as a standard signal. An example of the sensor unit having a zero point and sensitivity, which are subtly affected by an attached foreign particle, is a sensor unit of a semiconductor type. When the second-type acceleration signal generated by the vibration-type angular-speed sensor unit is used as the reference signal, on the other hand, it is possible to determine whether or not an abnormality has been generated in the acceleration sensor unit. In addition, the above description also indicates that, when a discrepancy between the first-type acceleration signal and the second-type acceleration signal is detected, at least, an abnormality generated in either of the vibration-type angular-speed sensor unit and the acceleration sensor unit, which serve as a sensor system, can be detected with a high degree of reliability even when it is impossible to determine whether the abnormality has been generated in the vibration-type angular-speed sensor unit or the accelerations sensor.

The acceleration sensor unit embraces a measurement principle different from that adopted by the vibration-type angular-speed sensor unit. That is, when the acceleration sensor unit is a non-vibrating acceleration sensor unit, the precision of the acceleration detection can be rather improved. As a result, the precision of the first-type acceleration signal can also be improved as well. The improved precision can be said to be an advantage from a standpoint of detecting an abnormality of the second-type acceleration signal, that is, an abnormality of the vibration-type angular-speed sensor unit. The non-vibrating acceleration sensor unit can adopt the commonly known configuration such as a configuration of the piezoelectric-device type, the electrostatic-capacitor type or a distortion-gage type.

It is to be noted that, in many cases, an acceleration generated in a travel motion of a vehicle includes components in a variety of frequency bands. In most of such cases, a filter is employed to produce only components in a frequency band required in the control of the vehicle. An example of the frequency band required in the control of the vehicle is a frequency band, which is lower than 30 Hz and includes the frequency of 0 Hz. In general, the frequency response characteristic of the second-type acceleration signal fetched out from a detection-object vibration component of the vibration-type angular-speed sensor is different from the frequency response characteristic of the first-type acceleration signal generated by the acceleration sensor such as particularly the non-vibrating acceleration sensor. In order to solve this problem, a frequency-characteristic conversion means is provided in a second-type acceleration-signal generation unit so that an advantage is gained as seen from a standpoint of improving the precision of detection of an abnormality generated in the vibration-type angular-speed sensor unit. In this case, the frequency-characteristic conversion means is a means for bringing the frequency response characteristic, which is exhibited by the second-type acceleration signal with respect to an input acceleration, to the frequency characteristic of the first-type acceleration signal. Such a frequency-characteristic conversion means is implemented by a filter unit such as a filter unit for filtering out signal components of an unnecessary band from the second-type acceleration signal.

Assume for example that the acceleration sensor unit has an acceleration detection signal generation unit and an output filter unit in the acceleration sensor unit. The output filter unit is a filter unit for filtering out unnecessary waveform components from the original waveform of the acceleration detection signal generated by the acceleration detection signal generation unit and outputting the first-type acceleration signal as a result of the filtering process. In this case, when the frequency-characteristic conversion means provided in the second-type acceleration-signal generation unit is implemented by a filter unit, which outputs the second-type acceleration signal and has the same filter type, the same filter order and the same filter cutoff frequency as the output filter unit provided in the acceleration sensor, the output phase shift from the second-type acceleration signal can be reduced as is the case with the first-type acceleration signal after passing through the filter unit. This can improve precision of the abnormality detection.

The vibration-type angular-speed sensor unit and the acceleration sensor unit can be accommodated in one box of a sensor system. Such a sensor system is referred to as an inertia sensor. By implementing the vibration-type angular-speed sensor unit and the acceleration sensor unit, which are indispensable to a vehicle control system, in one box, the mountability of the sensor system is improved, so that the assembly process can be standardized. In addition, the vibration-type angular-speed sensor unit and the acceleration sensor unit, which are accommodated in one box of a sensor system at positions close to each other, have the following merits:

(1) Since the vibration-type-angular-speed sensor unit and the acceleration sensor unit are accommodated in one box of a sensor system at positions close to each other, the lengths of wires for generating the first-type and second-type acceleration signals and for processing a signal for detection of an abnormality based on the first-type and second-type acceleration signals can be reduced and, in addition, the noise margins of the signals can be increased. In this case, it is preferable to mount the vibration-type angular-speed sensor unit and the acceleration sensor unit on the same board.

(2) Since the vibration-type angular-speed sensor unit and the acceleration sensor unit are accommodated in one box of a sensor system at positions close to each other, differences in sensor-environment effects can be decreased. The differences in sensor-environment effects are caused by differences in mounting positions. In this case, the sensor environment includes a noise vibration generation state and a mechanical resonance mode.

The vibration-type angular-speed sensor unit employed in the sensor system includes a pair of vibrators vibrating in a reference direction at phases opposite to each other; an angular-speed computation means for computing an angular speed based on opposite-phase waveform components output by the vibrators to vibrate in an angular-speed detection direction at phases opposite to each other and outputting an angular-speed detection signal as the computed angular speed; and an acceleration detection means for computing an acceleration based on same-phase waveform components output by the vibrators to vibrate in the angular-speed detection direction at the same phase and outputting a second-type acceleration signal representing the computed acceleration. In such a configuration, components generated by the pair of vibrators as components having phases opposite to each other are detected as an angular-speed signal and components generated by the pair of vibrators as components having the same phases are detected as an acceleration signal. Thus, the angular-speed signal and the acceleration signal can be separated from each other effectively.

To put it concretely, the angular-speed computation means computes an angular speed by mutual cancellation of the waveform components output by the vibrators to vibrate in the angular-speed detection direction at the same phase. On the other hand, the acceleration detection means computes acceleration by mutual cancellation of the waveform components output by the vibrators to vibrate in the angular-speed detection direction at phases opposite to each other. Thus, by carrying out simple addition and subtraction processes on the waveform components output by the vibrators to vibrate in the angular-speed detection direction, the angular speed and the acceleration can be separated from each other with ease.

When first-type and second-type acceleration signals can be generated in the sensor system, an abnormality detection method using the first-type and second-type acceleration signals can be implemented into a variety of configurations. For example, an abnormality detection unit computes a difference signal representing the difference between the first-type and second-type acceleration signals, generates an abnormality detection signal based on the level of the difference signal and outputs the generated abnormality detection signal.

BRIEF DESCRIPTION OF THE DRAWINGS

Objects, features and advantages of the present invention will become more apparent from the following detailed description made with reference to the accompanying drawings, in which.

PREFERRED EMBODIMENTS OF THE PRESENT INVENTION

Embodiments of the present invention are explained by referring to drawings.

Figure 1:
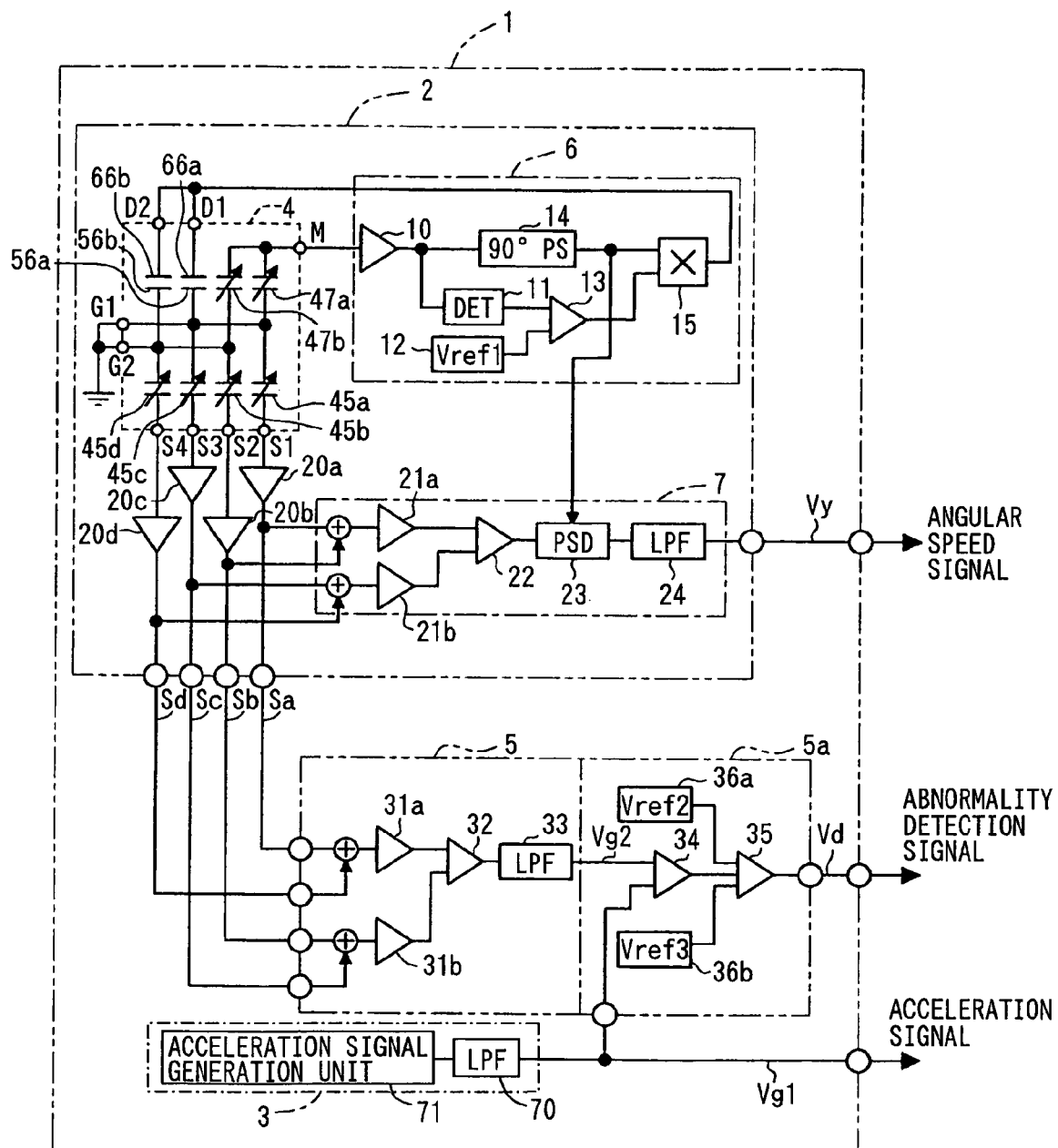
FIG. 1 is a circuit diagram showing a sensor system implemented according to a first embodiment.

FIG. 1 is a circuit diagram showing an embodiment implementing an inertia sensor system 1 provided by the present invention. Main components employed in the inertia sensor system 1 include an angular-speed sensor unit 2 and an acceleration sensor unit 3, which are accommodated in one box 50. The angular-speed sensor unit 2 and the acceleration sensor unit 3 are mounted on the same board. The angular-speed sensor unit 2 generates an angular-speed signal Vy and the acceleration sensor unit 3 generates an acceleration signal Vg1 (or a first-type acceleration signal).

Figure 2:
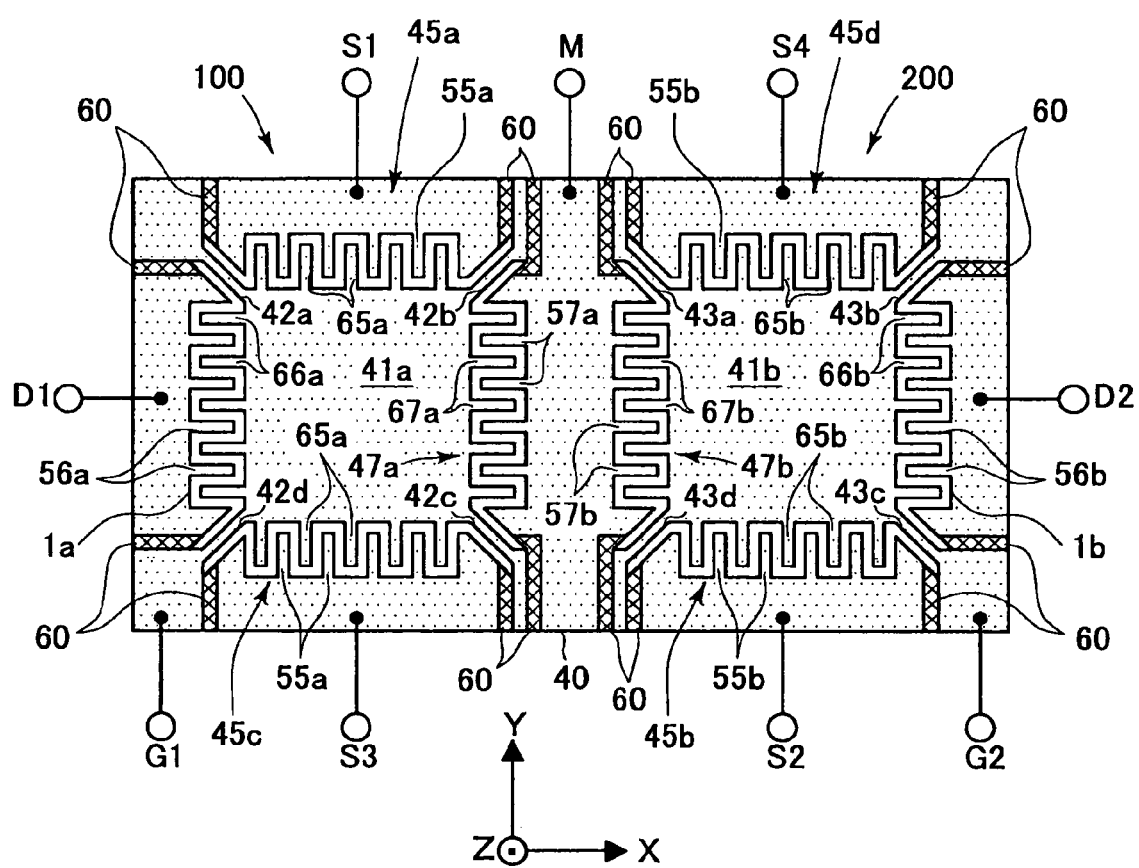
FIG. 2 is a diagram showing a model of a structure of a vibration-type acceleration sensor unit.

The angular-speed sensor unit 2 is a vibration-type angular-speed sensor having a vibration unit 4, a vibration-driving control unit 6 and an angular-speed detection unit 7. As shown in FIG. 2, the vibration unit 4 comprises a first sensor unit 100 and a second sensor unit 200. The first sensor unit 100 and the second sensor unit 200 respectively have first and second vibrators 41a and 41b vibrating in an X direction determined in advance. The X direction is also referred to hereafter as a reference direction. When an angular speed is applied to the first and second vibrators 41a and 41b, a detection-object vibration component in a Y direction set perpendicularly to the X direction is detected. The Y direction is also referred to hereafter as an angular-speed detection direction. To put it concretely, changes in capacitances shown in FIG. 1 are detected based on the detected detection-object vibration component. The first sensor unit 100 and the second sensor unit 200 are placed at adjacent positions separated away from each other in the X direction. It is to be noted that the waveform of the detection-object vibration is composed of an angular-speed vibration waveform and an acceleration vibration waveform superposed on the angular-speed vibration waveform in case a translational acceleration is added.

The vibration unit 4 is created by adoption of a technology of micro-machining a semiconductor such as silicon. In the configuration shown in FIG. 2, the first vibrator 41a of the first sensor unit 100 is engaged with a single frame 40 by beams 42a, 42b, 42c and 42d and the second vibrator 41b of the second sensor unit 200 is engaged with the frame 40 by beams 43a, 43b, 43c and 43d in such a way that the first and second vibrators 41a and 41b are capable of vibrating independently of the X and Y directions, which are perpendicular to each other.

A first driving-side fixed electrode 56a is attached to one specific inner side face of the frame 40 of the sensor unit 100. The first driving-side fixed electrode 56a has a shape resembling a comb with teeth thereof serving as X-direction unit electrodes separated from each other by equal intervals in the Y direction. By the same token, a second driving-side fixed electrode 56b is attached to one particular inner side face of the frame 40 of the sensor unit 200. The second driving-side fixed electrode 56b has a shape resembling a comb with teeth thereof serving as X-direction unit electrodes separated from each other by equal intervals in the Y direction. The aforementioned specific inner side face of the frame 40 and the aforementioned particular inner side face of the frame 40 are separated farthest from each other in the X direction, which is the vibration-driving direction. On the other hand, a first driving-side movable electrode 66a is attached to the inner face of the first vibrator 41a. The inner face of the first vibrator 41a faces the aforementioned specific inner side face of the frame 40 in the X direction. The first driving-side movable electrode 66a has a shape resembling a comb with teeth thereof serving as X-direction unit electrodes separated from each other by equal intervals in the Y direction. By the same token, a second driving-side movable electrode 66b is attached to the inner face of the second vibrator 41b. The inner face of the second vibrator 41b faces the aforementioned particular inner side face of the frame 40 in the X direction. The second driving-side movable electrode 66b has a shape resembling a comb with teeth thereof serving as X-direction unit electrodes separated from each other by equal intervals in the Y direction. The X-direction electrodes of the first driving-side fixed electrode 56a are mutually engaged with the X-direction electrodes of the first driving-side movable electrode 66a through gaps. In the same way, the X-direction electrodes of the second driving-side fixed electrode 56b are mutually engaged with the X-direction electrodes of the second driving-side movable electrode 66b through gaps.

On the other hand, at Y-direction ends of the sensor unit 100, capacitors 45a and 45c for vibration detection are provided whereas, at Y-direction ends of the sensor unit 200, capacitors 45b and 45d for vibration detection are provided. The Y direction is the angular-speed detection direction. For the sake of convenience, only four vibration-detection capacitors 45a, 45b, 45c and 45d are provided in this embodiment.

To put it concretely, a first detection-side fixed electrode 55a is attached to one specific inner side face of the frame 40 of the sensor unit 100. The first detection-side fixed electrode 55a has a shape resembling a comb with teeth thereof serving as Y-direction unit electrodes separated from each other by equal intervals in the X direction. By the same token, a second detection-side fixed electrode 55b is attached to one particular inner side face of the frame 40 of the sensor unit 200. The second detection-side fixed electrode 55b has a shape resembling a comb with teeth thereof serving as Y-direction unit electrodes separated from each other by equal intervals in the X direction. The aforementioned specific inner side face of the frame 40 and the aforementioned particular inner side face of the frame 40 are separated farthest from each other in the Y direction. On the other hand, a first detection-side movable electrode 65a is attached to the inner face of the first vibrator 41a. The inner face of the first vibrator 41a faces the aforementioned specific inner side face of the frame 40 in the Y direction. The first detection-side movable electrode 65a has a shape resembling a comb with teeth thereof serving as Y-direction unit electrodes separated from each other by equal intervals in the X direction. By the same token, a detection-side movable electrode 65b is attached to the inner face of the second vibrator 41b. The inner face of the second vibrator 41b faces the aforementioned particular inner side face of the frame 40 in the Y direction. The second detection-side movable electrode 65b has a shape resembling a comb with teeth thereof serving as Y-direction unit electrodes separated from each other by equal intervals in the X direction. The Y-direction electrodes of the first detection-side fixed electrode 55a are mutually engaged with the Y-direction electrodes of the first detection-side movable electrode 65a through gaps. In the same way, the Y-direction electrodes of the second detection-side fixed electrode 55b are mutually engaged with the Y-direction electrodes of the second detection-side movable electrode 65b through gaps. The first detection-side movable electrode 65a and the first detection-side fixed electrode 55a on the upper side in FIG. 2 form the vibration-detection capacitor 45a whereas the first detection-side movable electrode 65a and the first detection-side fixed electrode 55a on the lower side in FIG. 2 form the vibration-detection capacitor 45c. By the same token, the second detection-side movable electrode 65b and the second detection-side fixed electrode 55b on the upper side in FIG. 2 form the vibration-detection capacitor 45d whereas the second detection-side movable electrode 65b and the second detection-side fixed electrode 55b on the lower side in FIG. 2 form the vibration-detection capacitor 45b.

A first amplitude-monitoring capacitor 47a for executing feedback control on a drive amplitude is provided at an end on a specific inner side of the first sensor unit 100. By the same token, a second amplitude-monitoring capacitor 47b for executing feedback control on a drive amplitude is provided at an end on a particular inner side of the second sensor unit 200. The specific inner side of the first sensor unit 100 and the particular inner side of the second sensor unit 200 are separated from each other by a shortest distance in the X direction.

To put it concretely, a first monitor-side fixed electrode 57a is attached to the specific inner side face of the frame 40 of the sensor unit 100. The first monitor-side fixed electrode 57a has a shape resembling a comb with teeth thereof serving as X-direction unit electrodes separated from each other by equal intervals in the Y direction. By the same token, a second monitor-side fixed electrode 57b is attached to the particular inner side face of the frame 40 of the sensor unit 200. The second monitor-side fixed electrode 57b has a shape resembling a comb with teeth thereof serving as Y-direction unit electrodes separated from each other by equal intervals in the X direction. On the other hand, a first monitor-side movable electrode 67a is attached to the inner face of the first vibrator 41a. The inner face of the first vibrator 41a faces the aforementioned specific inner side face of the frame 40 in the X direction. The first monitor-side movable electrode 67a has a shape resembling a comb with teeth thereof serving as X-direction unit electrodes separated from each other by equal intervals in the Y direction. By the same token, a second monitor-side movable electrode 67b is attached to the inner face of the second vibrator 41b. The inner face of the second vibrator 41b faces the aforementioned particular inner side face of the frame 40 in the X direction. The second monitor-side movable electrode 67b has a shape resembling a comb with teeth thereof serving as X-direction unit electrodes separated from each other by equal intervals in the Y direction. The X-direction electrodes of the first monitor-side fixed electrode 57a are mutually engaged with the X-direction electrodes of the first monitor-side movable electrode 67a through gaps. In the same way, the X-direction electrodes of the second monitor-side fixed electrode 57b are mutually engaged with the X-direction electrodes of the second monitor-side movable electrode 67b through gaps. The first monitor-side movable electrode 67a and the first monitor-side fixed electrode 57a form the first amplitude-monitoring capacitor 47a, whereas the second monitor-side movable electrode 67b and the second monitor-side fixed electrode 57b form the second amplitude-monitoring capacitor 47b.

The electrodes 65a, 66a and 67a created on the faces of the first vibrator 41a are connected to a ground terminal G1 by the beam 42d. On the other hand, the electrodes 65b, 66b and 67b created on the faces of the second vibrator 41b are connected to a ground terminal G2 by the beam 43c. The ground terminal G1 and the ground terminal G2 are connected to the outside ground. On the surface of the frame 40, driving terminals D1 and D2, detection signal terminals S1, S2, S3 and S4 as well as a vibration monitor terminal M are created. The driving terminals D1 and D2 are connected to the first and second driving-side fixed electrodes 56a and 56b respectively. The detection signal terminals S1, S2, S3 and S4 are connected to the first and second detection-side fixed electrodes 55a and 55b. The vibration monitor terminal M is connected to the first and second monitor-side fixed electrodes 57a and 57b, which are electrically separated from each other by an isolation unit 60.

Refer back to FIG. 1. The vibration-detection capacitors 45a, 45b, 45c and 45d are respectively connected to capacitance-voltage converters 20a, 20b, 20c and 20d each used for converting a change in capacitance into a voltage. Adders/amplifiers 21a and 21b, a differential amplifier 22, a synchronization detection unit 23 and a low-pass filter 24 form an angular-speed detection unit 7 employed in the angular-speed sensor unit 2. The adder/amplifier 21a is a component for summing up outputs of the capacitance-voltage converters 20a and 20b and amplifying the sum. By the same token, the adder/amplifier 21b is a component for summing up outputs of the capacitance-voltage converters 20c and 20d and amplifying the sum. Serving as a difference waveform process means, the differential amplifier 22 is used for amplifying the difference between outputs of the adders/amplifiers 21a and 21b. The synchronization detection unit 23 is a component for extracting an angular-speed component and converting the extracted angular-speed component into a DC signal. The low-pass filter 24 is a component for eliminating unnecessary high-frequency components such as harmonics from the output of the synchronization detection unit 23.

A vibration-driving control unit 6 employed in the angular-speed sensor unit 2 includes a capacitance-voltage converter 10, an AC/DC converter 11, a reference-voltage generation unit 12, a differential amplifier 13, a phase shifter 14 and a multiplier 15. The capacitance-voltage converter 10 is a component for converting capacitance changes of the first and second amplitude-monitoring capacitors 47a and 47b into a voltage. The AC/DC converter 11 is a component for converting a vibration alternating-current voltage output by the capacitance-voltage converter 10 into a direct-current voltage. The reference-voltage generation unit 12 is a component for generating a reference voltage Vref. The differential amplifier 13 is a component for amplifying a difference between the reference voltage Vref and an amplitude monitor value, which is the direct-current voltage output by the AC/DC converter 11. The phase shifter 14 is a component for shifting the phase of the amplitude voltage output by the capacitance-voltage converter 10 by 90 degrees. The multiplier 15 is a component for multiplying the output of the differential amplifier 13 by the output of the phase shifter 14. The output of the multiplier 15 is supplied to driving terminals D1 and D2 of the first sensor unit 100 and the second sensor unit 200 respectively.

A second-type acceleration signal generation unit 5 employed in the inertia sensor system 1 for generating a second-type acceleration signal regarded includes adders/amplifiers 31a and 31b, a differential amplifier 32 and a low-pass filter 33. The adder/amplifier 31a is a component for summing up outputs of the capacitance-voltage converters 20a and 20d and amplifying the sum. By the same token, the adder/amplifier 31b is a component for summing up outputs of the capacitance-voltage converters 20b and 20c and amplifying the sum. The differential amplifier 32 is a component used for amplifying the difference between outputs of the adders/amplifiers 31a and 31b. The low-pass filter 33 is a component for eliminating unnecessary high-frequency components such as harmonics from the output of the differential amplifier 32. The low-pass filter 33 serves as a frequency-characteristic conversion means as well as a filter for outputting a second-type acceleration signal Vg2.

An abnormality detection unit 5a employed in the inertia sensor system 1 has a differential amplifier 34 and a window comparator 35. The differential amplifier 34 is a component for processing the second-type acceleration signal Vg2 output by the low-pass filter 33 and a first-type acceleration signal Vg1 output by the acceleration sensor unit 3 described below and outputting a difference signal ΔVg between the second-type acceleration signal Vg2 and the first-type acceleration signal Vg1. The window comparator 35 is a component for detecting an abnormality of the second-type acceleration signal Vg2 or the first-type acceleration signal Vg1 based on the difference signal • Vg.

It is to be noted that the acceleration sensor unit 3 employed in the inertia sensor system 1 has an acceleration-signal generation unit 71 and a low-pass filter 70. The acceleration-signal generation unit 71 includes a detection unit and a signal-processing circuit. The detection unit has a common configuration such as the piezoelectric-device type or the electrostatic-capacitance type. The signal-processing unit is a circuit for generating an acceleration signal based on a signal output by the detection unit. The low-pass filter 70 is an output filter unit provided in the acceleration sensor unit 3. The low-pass filter 70 eliminates unnecessary waveform components from the original waveform of the acceleration detection signal output by the acceleration-signal generation unit 71.

The vibration-driving control unit 6 described above fetches a vibration monitor signal representing changes of the capacitances of the amplitude-monitoring capacitors 47a and 47b from the monitor terminal M. The changes of the capacitance are caused by the vibrations of the first and second vibrators 41a and 41b. In the vibration-driving control unit 6, the capacitance-voltage converter 10 converts the vibration monitor signal into a voltage signal. The eventual output of the vibration-driving control unit 6 is fed back to the driving terminals D1 and D2 in a self-excitation vibration-driving mechanism. The phase shifter 14 performs the role of sustaining mechanical vibrations of the first and second vibrators 41a and 41b. The mechanical vibration of the first vibrator 41a propagates through the beams 42a, 42b, 42c and 42d whereas the mechanical vibration of the second vibrator 41*b* propagates through the beams 43*a*, 43*b*, 43*c* and 43*d*. A vibration monitor signal output by the capacitance-voltage converter 10 is smoothed by the AC/DC converter 11, being converted into an amplitude level signal. A difference between the amplitude level signal and the reference voltage signal generated by the reference-voltage generation unit 12 is processed by the differential amplifier 13 to produce a vibration correction signal. The multiplier 15 multiplies the vibration correction signal by the vibration monitor signal to control the drive amplitude to a fixed value. It is to be noted that the output of the multiplier 15 is fed back to the driving terminal D1 of the first sensor unit 100 and the driving terminal D2 of the second sensor unit 200. Thus, the first vibrator 41*a* and the second vibrator 41*b* are driven into vibrations in the X direction with phases opposite to each other at their resonance frequency.

Assume that, in the state described above, an angular speed is introduced around a Z direction perpendicular to both the X and Y directions. In the case of an inertia sensor system 1 mounted on a vehicle, the Z direction is a direction perpendicular to the surface of the road. When such an angular speed is applied, Coriolis forces generate an angular-speed vibration component on the first vibrator 41*a* in the Y direction and an angular-speed vibration component on the second vibrator 41*b* in the Y direction at a phase opposite to the phase of the angular-speed vibration component generated on the first vibrator 41*a*. These vibrations are detected as changes of the capacitances of the vibration-detection capacitors 45*a*, 45*b*, 45*c* and 45*d*. Signals representing the changes of the capacitances of the vibration-detection capacitors 45*a*, 45*b*, 45*c* and 45*d* are fetched at the terminals S1, S2, S3 and S4 respectively and, then, converted by the capacitance-voltage converters 20*a*, 20*b*, 20*c* and 20*d* respectively into angular-speed detection waveforms Sa, Sb, Sc and Sd respectively.

Figure 3:
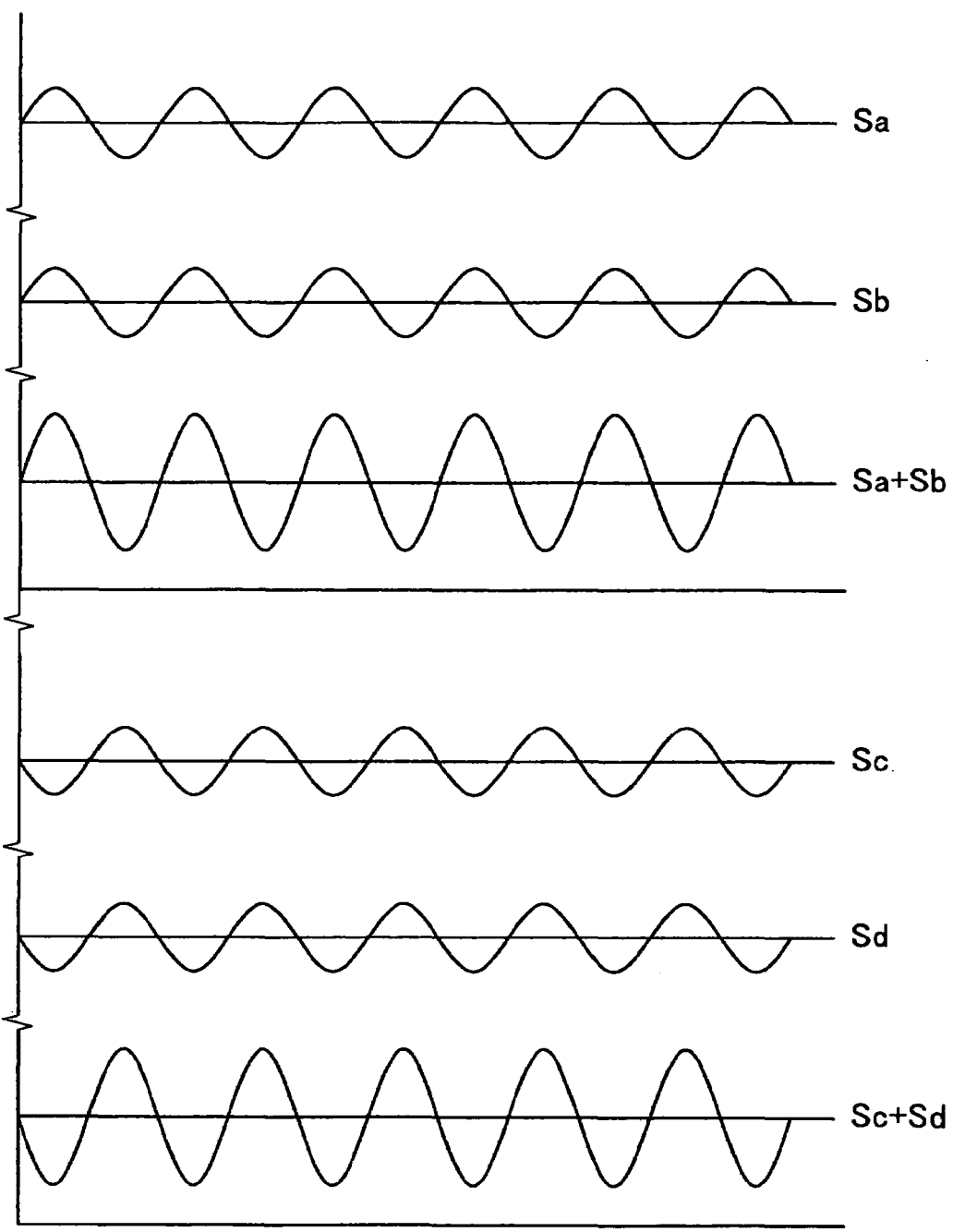
FIG. 3 is an explanatory diagram showing a concept of summing up angular-speed waveforms generated by electrodes of the vibration-type angular-speed sensor unit as signals with the same phase.

It is to be noted that, since the Coriolis force is applied to the first vibrator 41*a* in a direction opposite to the direction of the Coriolis force applied to the second vibrator 41*b*, the phase of the angular-speed detection waveform Sa output by the capacitance-voltage converter 20*a* is the same as the phase of the angular-speed detection waveform Sb output by the capacitance-voltage converter 20*b*, whereas the phase of the angular-speed detection waveform Sc output by the capacitance-voltage converter 20*c* is the same as the phase of the angular-speed detection waveform Sd output by the capacitance-voltage converter 20*d* as shown in FIG. 3. This is because the capacitance-voltage converter 20*a* receives a signal from the vibration-detection capacitor 45*a* of the first sensor unit 100 while the capacitance-voltage converter 20*b* receives a signal from the vibration-detection capacitor 45*b* of the second sensor unit 200 and, in the Y direction, the vibration-detection capacitors 45*a* and 45*b* are provided on the opposite sides of each other. By the same token, the capacitance-voltage converter 20*c* receives a signal from the vibration-detection capacitor 45*c* of the first sensor unit 100 while the capacitance-voltage converter 20*d* receives a signal from the vibration-detection capacitor 45*d* of the second sensor unit 200 and, in the Y direction, the vibration-detection capacitors 45*c* and 45*d* are provided on the opposite sides of each other. Then, the angular-speed detection waveform Sa and the angular-speed detection waveform Sb having the same phase as the angular-speed detection waveform Sa are supplied to the adder/amplifier 21*a* employed in the angular-speed detection unit 7 as shown in FIG. 1 as a component for summing up their amplitudes and amplifying the sum of the amplitudes. By the same token, the angular-speed detection waveform Sc and the angular-speed detection waveform Sd having the same phase as the angular-speed detection waveform Sc are supplied to the adder/amplifier 21*b* employed in the angular-speed detection unit 7 as a component for summing up their amplitudes and amplifying the sum of the amplitudes. These operations are devised in an effort to improve the sensitivity of the angular-speed detection. It is to be noted that, since signals representing the changes of the capacitances of the vibration-detection capacitors 45*a* and 45*c* associated with the first vibrator 41*a* have phases opposite to each other whereas signals representing the changes of the capacitances of the vibration-detection capacitors 45*b* and 45*d* associated with the second vibrator 41*b* have phases opposite to each other, these signals are converted individually into the angular-speed detection waveforms Sa, Sb, Sc and Sd by the capacitance-voltage converters 20*a*, 20*b*, 20*c* and 20*d* respectively before being supplied to the angular-speed detection unit 7 for generating an angular-speed signal and the second-type acceleration signal generation unit 5 for generating the second-type acceleration signal Vg2.

Figure 4:
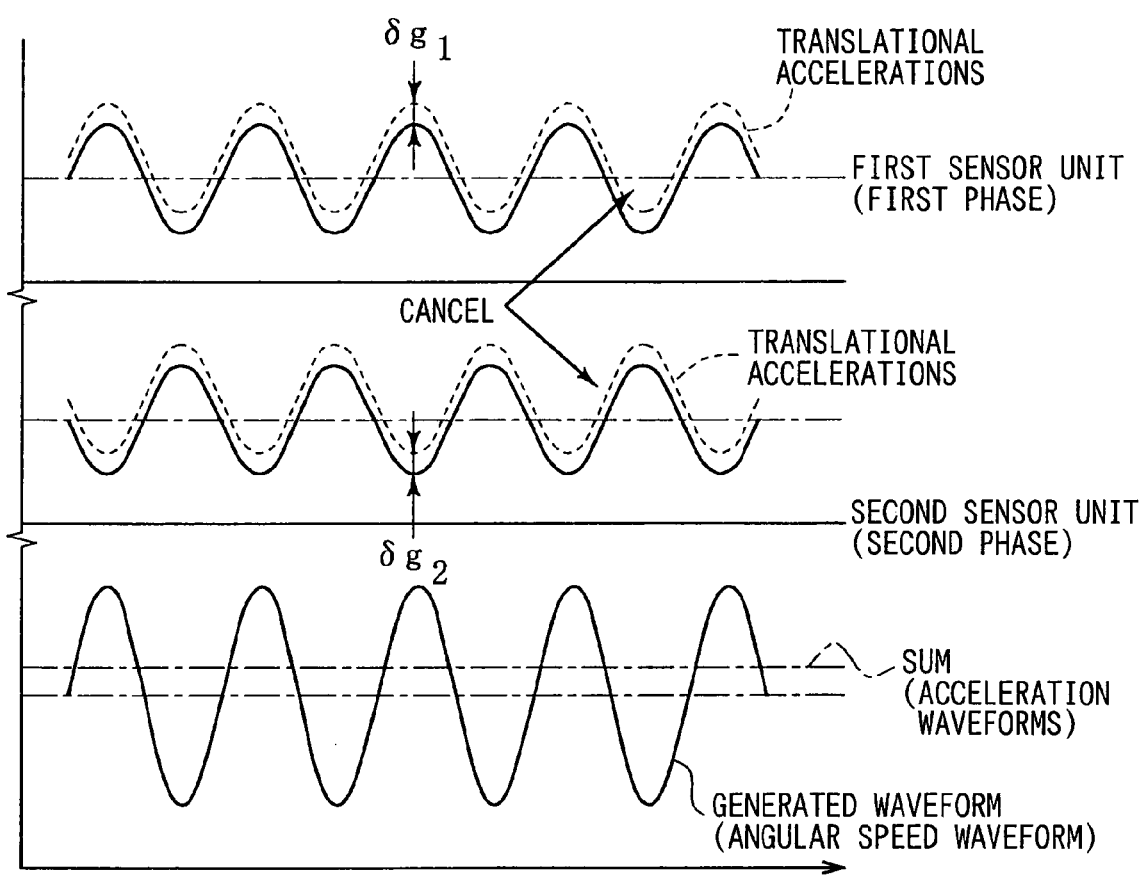
FIG. 4 is an explanatory diagram showing a concept of generating an angular-speed waveform and a second-type acceleration waveform based on detection-object vibration waveforms generated by two sensor units of the vibration-type angular-speed sensor unit.

For an input angular-speed, the output of the adder/amplifier 21*a* has a phase opposite to the phase of the output of the adder/amplifier 21*b*. Thus, the differential amplifier 22 further amplifies the difference between waveform signals output by the adders/amplifiers 21*a* and 21*b* in order to further increase the sensitivity of the angular-speed detection. In addition, when an angular speed is introduced around the Z direction, Coriolis forces are generated in the Y direction in the first sensor unit 100 and the second sensor unit 200 as forces opposing each other. As shown in FIG. 4, however, Y-direction translational accelerations caused by rotational centrifugal forces and burst vibrations are generated as components having the same phase. From the standpoint of the angular-speed signal, they are a kind of noise components. Nevertheless, by applying a difference process to the angular-speed detection waveform signals generated in the first sensor unit 100 and the second sensor unit 200 as described above, the acceleration components are canceled so that only the angular-speed signal can be fetched.

An amplitude-modulation angular signal output by the differential amplifier 22 is demodulated in the synchronization detection unit 23 before being supplied to the low-pass filter 24 for removing ripples from the signal. The low-pass filter 24 outputs a direct-current signal Vy proportional to the input rotational speed. A reference phase signal supplied to the synchronization detection unit 23 is a signal obtained by shifting the phase of the amplitude monitor signal by 90 degrees. That is, the reference phase signal is a signal output by the phase shifter 14. This is because the Coriolis forces for the input angular speed for a vibrator is generated at a phase shifted from the vibration phase of the vibrator.

Next, the angular-speed detection waveform signals Sa, Sb, Sc and Sd generated by the capacitance-voltage converters 20*a*, 20*b*, 20*c* and 20*d* respectively are supplied to the second-type acceleration signal generation unit 5. In the second-type acceleration signal generation unit 5, the angular-speed detection waveform signals Sa, Sb, Sc and Sd are subjected to addition and amplification processes different from the angular-speed detection unit 7. To be more specific, the angular-speed detection waveform Sa and the angular-speed detection waveform Sd are supplied to the adder/amplifier 31*a* employed in the second-type acceleration signal generation unit 5 as shown in FIG. 1 as a component for summing up their amplitudes and amplifying the sum of the amplitudes. By the same token, the angular-speed detection waveform Sb and the angular-speed detection waveform Sc are supplied to the adder/amplifier 31b employed in the second-type acceleration signal generation unit 5 as a component for summing up their amplitudes and amplifying the sum of the amplitudes. The differential amplifier 32 further amplifies the difference between waveform signals output by the adders/amplifiers 31a and 31b. As described above, Coriolis forces are generated in the Y direction for the first and second vibrators 41a and 41b as forces opposing each other but Y-direction translational accelerations are generated as components having the same phase as shown by dotted lines in FIG. 4. Thus, by applying a difference process to the angular-speed detection waveform signals generated for the first and second vibrators 41a and 41b as described above, the angular-speed components are canceled so that only a second-type acceleration signal Vg2 can be fetched.

The acceleration detection direction of the acceleration sensor unit 3 is set at the Y direction. When the acceleration sensor unit 3 is normal, a first-type acceleration signal Vg1 output by the acceleration sensor unit 3 exhibits higher reliability of acceleration detection than the second-type acceleration signal Vg2 generated as the so-called side product of the angular-speed detection. When the angular-speed sensor unit 2 is normal, on the other hand, the second-type acceleration signal Vg2 also shows an acceleration detection level approaching the first-type acceleration signal Vg1. Thus, a signal output by the differential amplifier 34 as a difference signal • Vg between the second-type acceleration signal Vg2 and the first-type acceleration signal Vg1 has a value close to a neutral point. In this case, in a state of generating an acceleration of a fixed frequency/amplitude, the neutral point of the difference signal is calibrated in advance by adjustment of the gain of an adjustment amplifier 36 on a signal path originating from typically the differential amplifier 32 or the acceleration sensor unit 3.

Due to a cause such as an infinitesimal foreign particle attached to the vibration unit 4 employed in the angular-speed sensor unit 2, however, when the sensitivity and zero point of each of the angular-speed detection waveform signals Sa, Sb, Sc and Sd output by the vibration unit 4 change, the sensitivity and zero point of the second-type acceleration signal Vg2 generated based on the angular-speed detection waveform signals Sa, Sb, Sc and Sd also change. As a result, the difference signal ΔVg between the second-type acceleration signal Vg2 and the first-type acceleration signal Vg1 generated by the acceleration sensor unit 3 detecting an actual acceleration is shifted from the neutral point. Thus, by supplying the difference signal ΔVg to the window comparator 35 having a reference voltage range [Vref2, Vref3] including the neutral point, it is possible to determine whether or not the difference signal ΔVg is within the prescribed range, that is, it is possible to determine whether or not an abnormality has been generated. The result of the determination is indicated by an abnormality detection signal Vd output by the window comparator 35. When a problem is raised in the acceleration sensor unit 3, causing the value of the first-type acceleration signal Vg1 to become abnormal, the difference signal ΔVg is also shifted from the neutral point as well. Thus, when the difference signal ΔVg is outside the reference voltage range, the abnormality detection signal Vd is output to indicate this abnormality in the same way. It is to be noted that, from a relation between the magnitudes of the second-type acceleration signal Vg2 and the first-type acceleration signal Vg1, as a general rule, it is possible to determine whether the second-type acceleration signal Vg2 or the first-type acceleration signal Vg1 is abnormal. This is because, in general, a foreign particle attached to a vibrator is equivalent to an increase in mass, and the increase in mass tends to raise the sensitivity for the acceleration. In this case, it is recommended to provide a first comparator for outputting a first abnormality detection signal Vd1 indicating an abnormal first-type acceleration signal Vg1 for a difference signal ΔVg higher than the upper limit voltage Vref2 and a second comparator for outputting a second abnormality detection signal Vd2 indicating an abnormal second-type acceleration signal Vg2 for a difference signal ΔVg lower than the lower limit voltage Vref3.

It is to be noted that, by making the frequency response characteristics of the second-type acceleration signal Vg2, which is generated based on the angular-speed detection waveform signals Sa, Sb, Sc and Sd, close to the acceleration sensor unit 3 as much as possible, an abnormality can rather be detected with a high degree of precision. Thus, the low-pass filter 33 for eliminating unnecessary components in the high-frequency band from the second-type acceleration signal Vg2 is provided as a filter unit for outputting the second-type acceleration signal. The frequency response characteristics include a cutoff frequency and the type and order of the filter. When a low-pass filter 70 serving as an output filter unit in the acceleration sensor 3 has a second-order butterworth characteristic and a cutoff frequency of 30 Hz, for example, it is preferable to set the tolerance of the cutoff frequency for the same type and order of the filter at a value within about ±10%. With this tolerance range, the cutoff frequency of the low-pass filter 33 can be regarded as a frequency equal to the cutoff frequency of the low-pass filter 70. It is preferable to set the tolerance at a value in this range because the phase of the output first-type acceleration signal Vg1 can be set to match the phase of the output second-type acceleration signal Vg2 and an error generated in the computation of a difference between the output first-type acceleration signal Vg1 and the output second-type acceleration signal Vg2 can be reduced.

The above descriptions indicate that, for example, by using signals generated by the angular-speed sensor unit 2 implemented as an angular-speed sensor having a vibration type, an acceleration generated in a vehicle such as a car including an on-board inertia sensor system 1 can be produced as a second-type acceleration signal Vg2, which is then compared with a first-type acceleration signal Vg1 output by the acceleration sensor unit 3 for detecting an actual acceleration to make use of the second-type acceleration signal Vg2 as information reflecting normality of the acceleration sensor unit 3. As an excellent result, it is possible to detect for example an abnormality, which is caused by a slight change of the sensitivity and/or zero point of the acceleration sensor unit 3 and cannot be detected by the conventional sensor system, with a high degree of precision. In addition, since the second-type acceleration signal Vg2 is compared with the first-type acceleration signal Vg1 output by the acceleration sensor unit 3, the inertia sensor system 1 has a merit of a capability of detecting an abnormality of the acceleration sensor unit 3.

Figure 5:
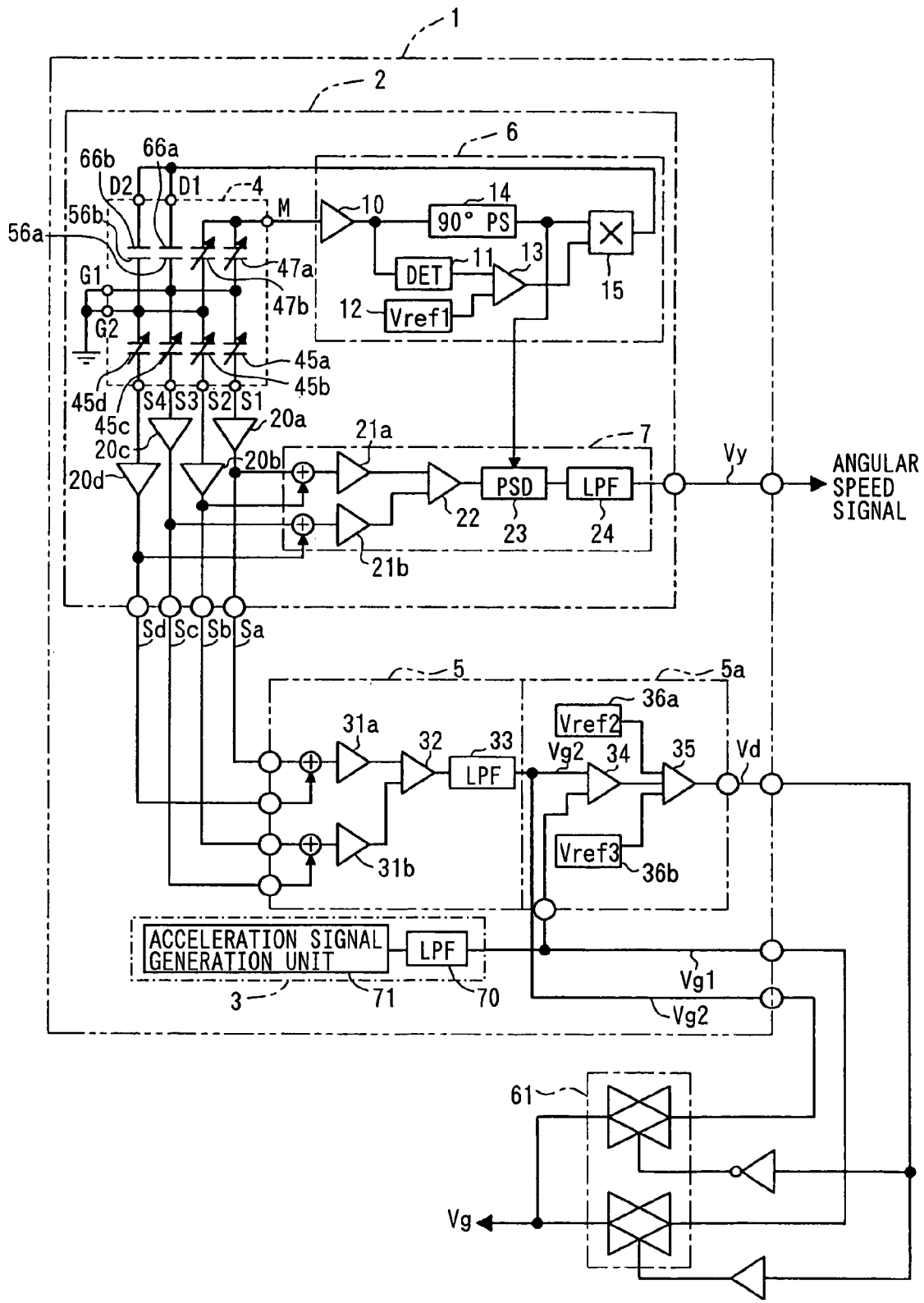
FIG. 5 is a circuit diagram of a sensor system implemented according to a second embodiment.

Typical modifications of the inertia sensor system 1 provided by the present invention are explained as follows. Since the acceleration signals of the two systems with different detection mechanisms are generated from the inertia sensor system 1 shown in FIG. 1, when an abnormality is generated in the acceleration signal of one of the systems, the acceleration signal of the other system can be used as a backup. To put it concretely, when the regular acceleration sensor unit 3 is normal, the first-type acceleration signal Vg1 is used as an acceleration signal Vg. When the regular acceleration sensor unit 3 is abnormal, on the other hand, the second-type acceleration signal Vg2 is used as the acceleration signal Vg. In a configuration shown in FIG. 5, the second-type acceleration signal Vg2 and the first-type acceleration signal Vg1 can each be output individually. Driven by an abnormality detection signal Vd, a change-over switch 61 selects the first-type acceleration signal Vg1 in the event of a normality and selects the second-type acceleration signal Vg2 in the event of an abnormality. That is, the change-over switch 61 is capable of switching the output signal from the second-type acceleration signal Vg2 to the first-type acceleration signal Vg1 or vice versa. In the event of an abnormality, the abnormality detection signal Vd is set at an L level. As a mechanism of the change-over switch 61, the change-over switch 61 can be incorporated outside or inside the box 50 of the inertia sensor system 1.

Figure 6:
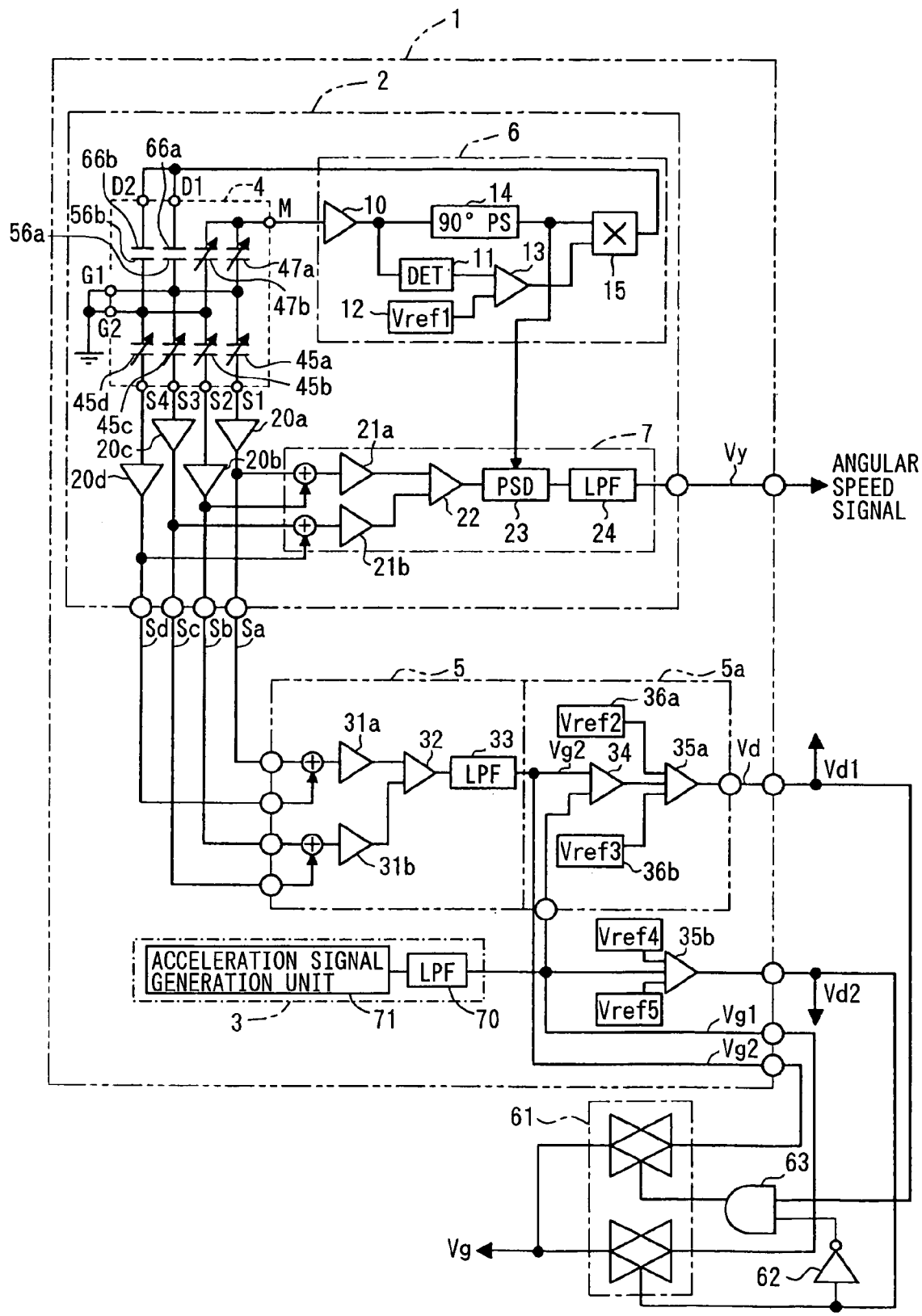
FIG. 6 is a circuit diagram of a sensor system implemented according to a third embodiment.

In a configuration shown in FIG. 6, reference-voltage ranges [Vref2, Vref3] and [Vref4, Vref5] are provided individually for the first-type acceleration signal Vg1 and the second-type acceleration signal Vg2 respectively. In addition, a first abnormality detection signal Vd1 is generated for the angular-speed sensor unit 2 and a second abnormality detection signal Vd2 is generated for the acceleration sensor unit 3. Thus, first and second window comparators 35a and 35b are provided independently of each other. Much like the configuration shown in FIG. 5, the change-over switch 61 is capable of switching the output signal from the second-type acceleration signal Vg2 to the first-type acceleration signal Vg1 or vice versa. Since both the second-type acceleration signal Vg2 and the first-type acceleration signal Vg1 can be abnormal, however, the, output paths of the second-type acceleration signal Vg2 and the first-type acceleration signal Vg1 can both be cut off in case the second-type acceleration signal Vg2 and the first-type acceleration signal Vg1 are abnormal. In this embodiment, the first abnormality detection signal Vd1 output by the first window comparator 35a as an abnormality detection signal for the first-type acceleration signal Vg1 is used as a switching signal of the first-type acceleration signal Vg1. On the other hand, a signal output by an AND gate 63 is used as a switching signal of the second-type acceleration signal Vg2. The AND gate 63 inputs the inverted signal of the first abnormality detection signal Vd1 and the second abnormality detection signal Vd2 output by the second window comparator 35b as an abnormality detection signal for the second-type acceleration signal Vg2. The inverted signal of the first abnormality detection signal Vd1 is generated by an inverter 62. With such a circuit, the change-over switch 61 always outputs the first-type acceleration signal Vg1 when the first abnormality detection signal Vd1 is put in a normal state but, when the first abnormality detection signal Vd1 is put in an abnormal state, the change-over switch 61 outputs the second-type acceleration signal Vg2 only when the second abnormality detection signal Vd2 is put in a normal state.

In all the embodiments described above, the acceleration detection waveforms generated from the two sensor units with phases different from each other are processed to generate a second-type acceleration signal. In many cases, however, a translational acceleration component is generated in the vehicle on a lower-frequency side than the driving frequency of the vibration-side angular-speed sensor. Thus, it is also possible to adopt a method whereby an acceleration component becoming a second-type acceleration signal can be extracted by using a low-pass filter or a notch filter for eliminating a driving frequency component from an acceleration detection waveform generated by one sensor unit.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sensor system comprising:
   a vibration-type angular-speed sensor unit including:
      a pair of vibrators vibrating in a reference direction determined in advance at phases opposite to each other, wherein the pair of vibrators output opposite-phase waveform components to vibrate in an angular-speed detection direction at phases opposite to each other and same-phase waveform components to vibrate in the angular-speed detection direction at a same phase, wherein the angular-speed detection direction is perpendicular to the reference direction; and
      a detection waveform generation unit for detecting a detection-object vibration component resulting from application of an angular speed to the vibrator as a component in the angular-speed detection direction and for generating an angular-speed detection waveform based on the detection-object vibration component;
   an acceleration sensor unit for outputting a first-type acceleration signal, wherein the first acceleration sensor unit is provided separately from the vibration-type angular-speed sensor unit;
   a second-type acceleration-signal generation unit for extracting an acceleration signal component from the same-phase waveform components generated by the vibration-type angular-speed sensor unit and outputting the extracted acceleration signal component as a second-type acceleration signal; and
   an abnormality detection unit for detecting an abnormality of at least the vibration-type angular-speed sensor unit or the acceleration sensor unit based on the second-type acceleration signal and the first-type acceleration signal.

2. A sensor system according to claim 1, wherein a frequency-characteristic conversion device is provided in the second-type acceleration-signal generation unit for bringing the frequency response characteristic, which is exhibited by the second-type acceleration signal with respect to an input acceleration, to the frequency characteristic of the first-type acceleration signal.

3. A sensor system according to claim 2, wherein:
   the acceleration sensor unit includes:
      an acceleration detection signal generation unit; and
      an output filter provided in the acceleration sensor unit for eliminating unnecessary waveform components from the original waveform of an acceleration detection signal generated by the acceleration detection signal generation unit and outputting the remaining waveform as the first-type acceleration signal, and
   the frequency-characteristic conversion means provided in the second-type acceleration-signal generation unit is implemented by a filter unit, which outputs the second-type acceleration signal and has the same filter type, the same filter order and the Same filter cutoff frequency as the output filter provided in the acceleration sensor unit.

4. A sensor system according to claim 1, wherein the vibration-type angular-speed sensor unit and the acceleration sensor unit are accommodated in one box.

5. A sensor system according to claim 1, wherein the abnormality detection unit computes a difference signal representing the difference between the first-type acceleration signal and the second-type acceleration signal, generates an abnormality detection signal based on the level of the difference signal and outputs the generated abnormality detection signal.

6. A sensor system according to claim 5, further comprising a change-over switch for selecting either the first-type acceleration signal or the second-type acceleration signal based on the abnormality detection signal generated by the abnormality detection unit.

7. A sensor system according to claim 5, further comprising:
a window comparator coupled to the acceleration unit for outputting another abnormality detection signal when the first-type acceleration signal is not within a predetermined reference voltage range; and
a change-over switch for selecting either the first-type acceleration signal or the second-type acceleration signal based on the abnormality detection signal generated by the abnormality detection unit and the another abnormality detection signal generated by the window comparator coupled to the acceleration sensor unit.

8. A sensor system comprising:
a vibration-type angular-speed sensor unit including:
a pair of the vibrators vibrating in a reference direction determined in advance at phases opposite to each other; and
a detection waveform generation unit for detecting a detection-object vibration component resulting from application of an angular speed to the vibrator as a component in an angular-speed detection direction set to cross the reference direction and for generating an angular-speed detection waveform based on the detection-object vibration component;

an acceleration sensor unit for outputting a first-type acceleration signal, wherein the first acceleration sensor unit is provided separately from the vibration-type angular-speed sensor unit;
a second-type acceleration-signal generation unit for extracting an acceleration signal component from a detection-object vibration component generated by the vibration-type angular-speed sensor unit and outputting the extracted acceleration signal component as a second-type acceleration signal;
an abnormality detection unit for detecting an abnormality of at least the vibration-type angular-speed sensor unit or the acceleration sensor unit based on the second-type acceleration signal and the first-type acceleration signal,
an angular-speed computation means for computing an angular speed based on opposite-phase waveform components output by the vibrators to vibrate in the angular-speed detection direction at phases opposite to each other and outputting an angular-speed detection signal as the computed angular speed; and
an acceleration detection means for computing an acceleration based on same-phase waveform components output by the vibrators to vibrate in the angular-speed detection direction at the same phase and outputting the second-type acceleration signal as the computed acceleration.

9. A sensor system according to claim 8, wherein:
the angular-speed computation means computes an angular speed by mutual cancellation of the waveform components output by the vibrators to vibrate in the angular-speed detection direction at the same phase; and
the acceleration detection means computes an acceleration by mutual cancellation of the waveform components output by the vibrators to vibrate in the angular-speed detection direction at phases opposite to each other.

* * * * *